United States Patent [19]

Kassai

[11] Patent Number: 4,750,714
[45] Date of Patent: Jun. 14, 1988

[54] CUSHION CONSTRUCTION FOR CHILD'S SAFETY SEAT FOR USE IN AUTOMOBILES

[75] Inventor: Kenzou Kassai, Osaka, Japan

[73] Assignee: Aprica Kassai Kabushikikaisha, Osaka, Japan

[21] Appl. No.: 932,683

[22] Filed: Nov. 18, 1986

[30] Foreign Application Priority Data

Nov. 29, 1985 [JP] Japan ................. 60-269893

[51] Int. Cl.⁴ .................................. B60R 21/10
[52] U.S. Cl. ........................ 297/219; 297/250
[58] Field of Search ............. 297/284, DIG. 1, 250, 297/216, 219, 455, 456, 396, 391; 5/DIG. 2, 464, 486

[56] References Cited

U.S. PATENT DOCUMENTS

| | | | |
|---|---|---|---|
| 3,325,213 | 6/1967 | Levy | 297/250 X |
| 3,521,311 | 7/1970 | Cohen | 5/464 |
| 3,751,111 | 8/1973 | Taylor et al. | 297/456 |
| 3,840,920 | 10/1974 | Voelker | 297/284 X |
| 3,846,857 | 11/1974 | Weinstock | 5/464 |
| 3,939,508 | 2/1976 | Hall et al. | 5/464 |
| 3,972,565 | 8/1976 | Smith | 297/455 |
| 3,981,534 | 9/1976 | Wilton | 297/219 |
| 3,997,214 | 12/1976 | Jacobs | 297/214 |
| 4,082,350 | 4/1978 | Tomforde | 297/250 X |
| 4,113,306 | 9/1978 | von Wimmersperg | 297/250 X |
| 4,555,137 | 11/1985 | Göldner | 297/460 X |

FOREIGN PATENT DOCUMENTS 145625 5/1978 Japan .

Primary Examiner—Peter A. Aschenbrenner
Attorney, Agent, or Firm—W. G. Fasse; D. H. Kane, Jr.

[57] ABSTRACT

A child's safety seat for use in automobiles has a body (11). At least the backrest portion (11a) of the body (11) which supports an infant's head from behind has at least three cushion layers (13, 14, 15) for providing a shock absorbing effect which corresponds to the size of an impact.

7 Claims, 2 Drawing Sheets

CUSHION CONSTRUCTION FOR CHILD'S SAFETY SEAT FOR USE IN AUTOMOBILES

FIELD OF THE INVENTION

This invention relates to a child's safety seat for use in automobiles which ensures the safety of a baby or child sitting in an automobile by retaining the body in a fixed position, especially when the automobile is in motion. More specifically, the invention relates to a cushion construction for such a seat.

DESCRIPTION OF THE PRIOR ART

This type of child's safety seat for use in automobiles is adapted to be firmly fixed on the seat of an automobile by utilizing the seat belt furnished as part of the automobile. These safety seats are so constructed that the baby's or child's body is firmly held and will remain in a fixed position when the automobile is quickly braked, or is going around a sharp curve, or even when it is involved in a collision accident. Such child's safety seats are desirable from the standpoint of safety.

It is said that man's brain grows up to 80-90% completion by the age of about 3. For this reason, in designing equipment intended for infants, some means is required which particularly protects the head and thus the brain and does not interfere with its growth. A safety seat, which is expected to protect an infant from shocks particularly due to collision accidents, should receive sufficient consideration for the protection of the head.

FIG. 2 shows a child's safety seat disclosed in Japanese Utility Model Application Laying-Open No. 145625/1978. The known child's safety seat 1 has an air bag 2 attached to the upper backrest region thereof for resiliently supporting and protecting the child's head.

However, the air bag 2 as shown in FIG. 2 will not sufficiently act to absorb shocks such as those exerted when the automobile is involved in a collision accident. The reason is that the air bag 2 has a spring force, so that when the air bag is subjected to a shock, it is once defomred to stop the child's head but thereafter pushes back the head by its repulsive force. Therefore, the air bag 2 cannot be expected to function sufficiently as a head protection.

Further, since the air bag 2 resiliently supports the child's head all the time, the child's head is constantly moving back and forth, a fact which is not good for the health. Furthermore, since the air bag 2 projects beyond the backrest, the child's backbone is forced to bend. When the health of the child is taken into consideration, it is desirable that a child sitting on the child's safety seat must sit in a posture in which the backbone is straightened upwardly.

It is also known to provide a child's safety seat with a cushion member covering the backrest of the safety seat. This is selected with regard to providing type of cushion member a soft touch to a baby or child. Thus, such cushion member tends to be made too soft for absorbing a severe shock.

SUMMARY OF THE INVENTION

Accordingly, it is an object of the invention to provide a cushion construction for a child's safety seat for use in automobiles which, when subjected even to a severe shock, is adapted to absorb this shock to protect the infant's head substantially without any back bouncing.

This invention is a cushion construction for a child's safety seat for use in automobiles which is adapted to be installed on a body having a backrest portion and a seat portion. The cushion construction is characterized in that in the portion of the backrest of the body of the seat, which is located to support from behind at least the head of an infant sitting on said child's safety seat, there are at least three cushion layers to obtain an intended shock absorbing effect.

Since the cushion member formed of at least three layers is disposed behind the head, the shock will be absorbed in three stages for effectively protecting the infant's head. The material or property of each layer of the cushion member is selected for its particular purpose. For example, the outermost layer of the cushion material may be made of a soft material to give a soft touch to the infant while the intermediate or innermost layer may be made of a material which will not deform when subjected to a small force but will deform when subjected to a severe shock for absorbing such severe shocks.

As described above, according to the invention, in the cushion portion located for supporting the infant's head from behind, there are three cushion layers. Thus, even if the infant's head is subjected to a severe shock, as in a collision accident, the shock is absorbed in at least three stages. Therefore, the shock absorbing effect can be fully developed to protect the infant's head. Further, it is possible to impart the shock absorbing function to the intermediate and innermost layers while using a soft material for the outermost layer. In that case, it is also possible to give a soft touch to the infant.

These objects and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE OF THE INVENTION

Figure 1:
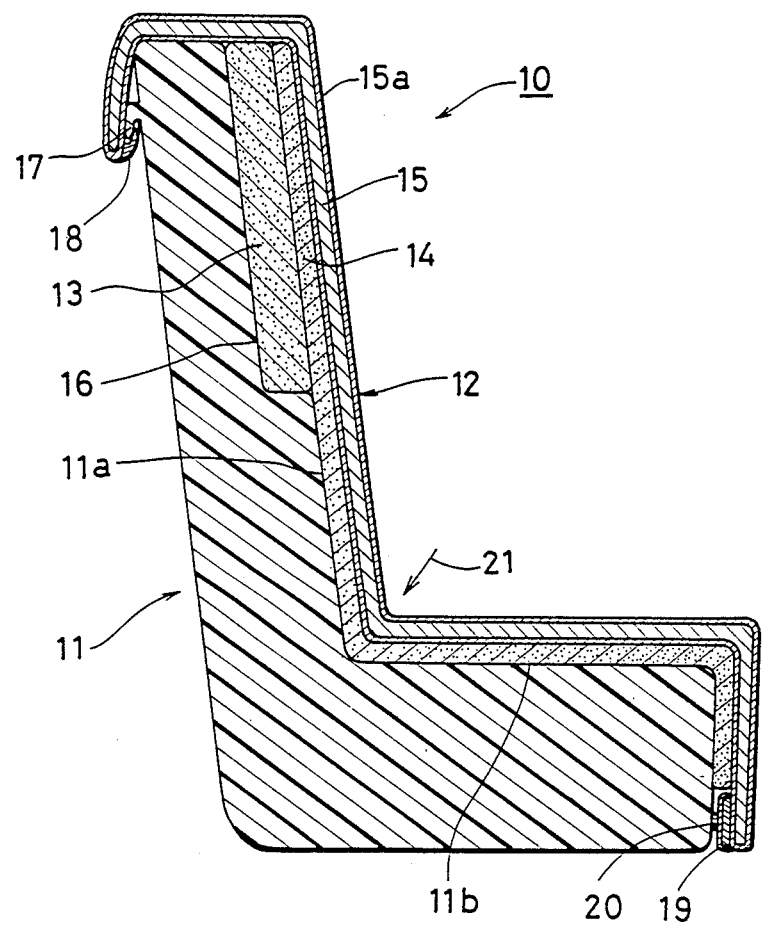
FIG. 1 is a schematic sectional view of a child's safety seat for use in automobiles according to the invention.
Figure 2:
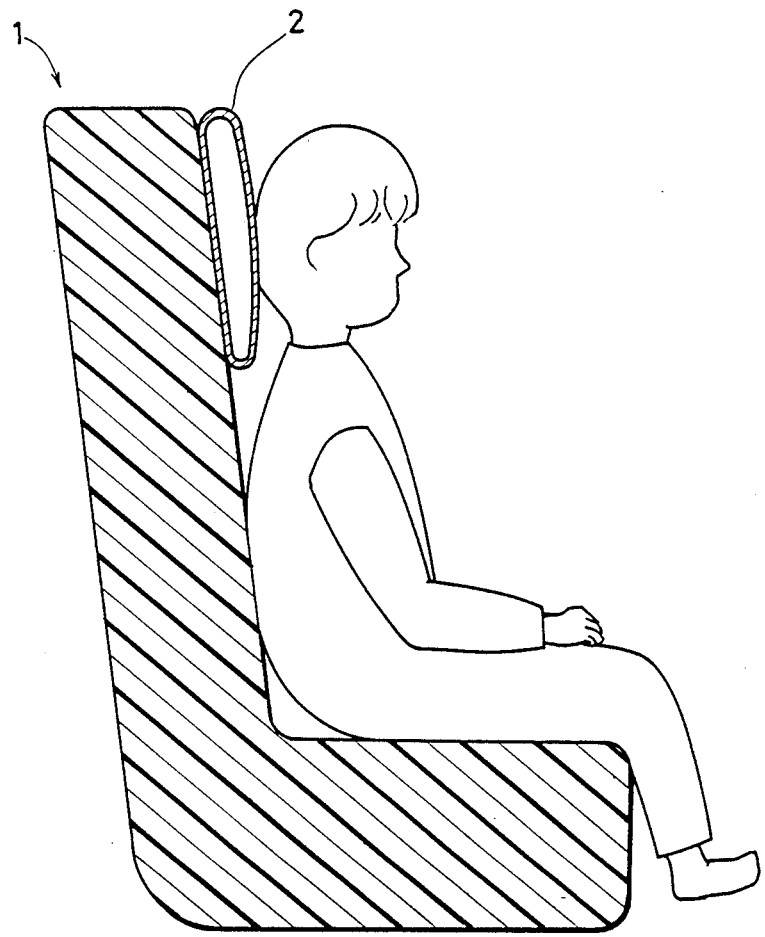
FIG. 2 is a schematic sectional view showing a child's safety seat as disclosed in Japanese Utility Model Application Laying-Open No. 145625/1978.

A child's safety seat 10 for use in automobiles comprises a body 11 formed, e.g., by resin molding, and a cushion structure 12. The body 11 has a backrest portion 11a, and a seat portion 11b. The body of an infant sitting on the safety seat 10 is firmly held thereon by a safety belt (not shown) when the automobile is in motion. The child's safety seat 10 itself is firmly fixed on the seat of the automobile by utilizing a seat belt of the automobile.

As shown, in the portion 11a of the backrest of the body 11 which is located to support from behind at least the infant's head, there are three cushion layers 13, 14 and 15. The upper portion of the backrest portion 11a of the body 11 has a concave recess 16, in which the innermost cushion layer 13 is received. The material of the innermost layer 13 is, e.g., urethane chips, the thickness of said layer 13 being greater than the other two layers 14 and 15. The material of said innermost layer 13 has preferably such a property that the layer does not deform when subjected to a small force but deforms when subjected to a severe force such as a shock to absorb it. The purpose of the increased thickness of the innermost layer is to promote the shock absorbing effect. The reason for placement of the innermost cushion layer 13 only in the upper region of the backrest portion 11a is that the protection of the infant's head is most important, such placement not being necessary in the other region. Since the thick innermost cushion layer 13 is received in the recesss 16, the intermediate and outermost cushion layers 14 and 15 overlying innermost layer 13 will spread flat over the backrest portion. Thus, the baby or child is allowed to sit on the child's safety seat 10 in the correct posture with the backbone straightened upwardly.

The intermediate and outermost cushion layers 14 and extend over the entire backrest and seat portions 11a and 11b of the body 11, as shown, whereby, the shock can be mitigated. The intermediate cushion layer 14 is made of urethane chips, as is the innermost cushion layer 13. Therefore, it will not deform when subjected to a small force but will deform when subjected to a great force to absorb it. On the other hand, the outermost cushion layer 15 is made of a soft material, such as urethane foam to give a soft touch to the infant. The outermost cushion layer 15 is covered with a cloth 15 for purposes including an improved of aesthetic effect.

The upper end of the outermost cushion layer 15 extends beyond the upper end of the body 11 to the back. The front end portion is formed with a bag-like portion 18 formed of cloth. The backrest portion 11a of the body 11 is formed with a downwardly directed hook portion 17. Thus, by engaging the hook portion 17 of the body 11 with the bag-like portion 18 of the outermost cushion layer 15, the outermost cushion layer 15 is fixed at its upper end to the body 11. On the other hand, the lower end portion of the outermost cushion layer 15 has a core 19 attached thereto for stiffening. The core 19 and the lower end portion of the body 11 are fixed together by a fastener 20. Further, though not shown in FIG. 1, the outermost cushion layer 15 and the body 11 are fixed together by a fastener at a position indicated by an arrow 21 in the boundary between the backrest portion and the seat portion. In this manner, the outermost cushion layer 15 and the body 11 are removably fastened together. Preferably, the outermost cushion layer 15 is made of washable material. Therefore, when the outermost cushion layer 15 is soiled, it can be separated from the body 11 for washing by undoing the fastener 20 and the fastener at the position indicated by the arrow 21.

The operation of the cushion layers 13, 14 and 15 will now be considered. Under normal operating conditions of the automobile, only the outermost layer 15 is deformed to give a soft touch to the baby or child. The intermediate and innermost cushion layers are not deformed, since there is no particularly great force applied thereto under normal conditions. When the automobile is quickly braked or rapidly accelerated, a relatively great force is applied to the intermediate cushion layer 14, so that the latter is deformed to absorb the force. However, in that case, the innermost cushion layer will be hardly deformed. If the automobile is involved in a collision accident, a severe shock acts on the cushion layers 13, 14 and 15. The severe shock cannot be absorbed by the intermediate cushion layer 14 alone; therefore, the innermost cushion layer 13 is also deformed to absorb the shock.

The embodiment described above and illustrated in the drawings is an example of the invention only. Thus, various modifications and changes are possible. For example, in the illustrated embodiment, in the head portion for supporting an infant's head from behind three cushion layers have been illustrated, but the invention is not limited thereto and four or more layers may be provided. Further, the innermost cushion layer 13 is located in the recess 16, but there may be a case in which such recess 16 is not provided. In that case, the innermost layer 13 will extend throughout the backrest portion 11a of the body 11.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An infant's automobile safety seat, comprising a seat body having a seat portion and a backrest portion, shock absorbing means forming part of said backrest portion for damping an impact responsive motion of an infant sitting on said safety seat in a controlled manner in accordance with the size of an impact and with a first damping characteristic effective for an infant's head and neck while a second damping characteristic is effective for the infant's body, said shock absorbing means comprising a first resilient layer (15) having a first given relatively soft resiliency for damping relatively small impacts, said first resilient layer being located behind an infant's head and body, a second intermediate resilient layer (14) having a resiliency smaller than said given resiliency of said first layer, said second layer also being located behind an infant's head and body for damping impacts of intermediate size that have not been fully damped by said first layer, said backrest portion of said seat body having a recess (16) substantially only behind an infant's neck and head, and a third innermost resilient layer (13) thicker than said first and second layers, said third layer being located only in said recess (16) and having a resiliency smaller than that of said second layer for further damping from behind an infant's head movements caused by larger impacts that have not been fully damped by said first and second layers, whereby impacts are progressively damped in three stages from behind for the infant's head, but only in two stages for the infant's body in accordance with the size of an impact.

2. The safety seat of claim 1, wherein at least said first relatively soft layer is flat and covers the entire backrest surface.

3. The safety seat of claim 1, wherein said first relatively soft layer (15) and said second intermediate layer (14) cover at least the entire backrest portion.

4. The safety seat of claim 1, wherein said innermost layer (13) is made of urethane chips.

5. The safety seat of claim 1, further comprising a cover (15a) of cloth for covering said first outermost layer.

6. The safety seat of claim 1, further comprising means for removably attaching said first outermost layer to said seat body.

7. The cover of claim 1, wherein said first outermost layer is made of a washable material.

* * * * *